United States Patent
Hester

(10) Patent No.: US 9,649,736 B2
(45) Date of Patent: May 16, 2017

(54) WORKPIECE HANDLING

(71) Applicant: SEAGATE TECHNOLOGY LLC, Cupertino, CA (US)

(72) Inventor: Grant N. Hester, Longmont, CO (US)

(73) Assignee: Seagate Technology LLC, Cupertino, CA (US)

(*) Notice: Subject to any disclaimer, the term of this patent is extended or adjusted under 35 U.S.C. 154(b) by 0 days.

(21) Appl. No.: 14/840,101

(22) Filed: Aug. 31, 2015

(65) Prior Publication Data
US 2017/0057036 A1    Mar. 2, 2017

(51) Int. Cl.
| B26D 1/26 | (2006.01) |
| B23Q 3/00 | (2006.01) |
| B23Q 7/06 | (2006.01) |
| B23Q 3/06 | (2006.01) |
| B25J 11/00 | (2006.01) |

(52) U.S. Cl.
CPC .............. B23Q 7/06 (2013.01); B23Q 3/06 (2013.01); B25J 11/00 (2013.01)

(58) Field of Classification Search
CPC .............. B23Q 3/06; B23Q 7/06; B25J 11/00
USPC ............... 414/800; 83/582, 587; 269/303
See application file for complete search history.

(56) References Cited

U.S. PATENT DOCUMENTS

| 2,381,956 A | * | 8/1945 | Holtz | B23Q 3/06 451/367 |
| 3,107,910 A | * | 10/1963 | Wiemken | B23Q 3/06 269/146 |
| 3,222,053 A | * | 12/1965 | Severdia | B23Q 3/06 24/523 |
| 3,520,219 A | * | 7/1970 | Treff | B26D 7/025 269/303 |
| 4,094,217 A | * | 6/1978 | Exline | B26D 1/035 83/368 |
| 4,549,457 A | * | 10/1985 | Bloch | B26F 1/02 219/89 |
| 4,775,135 A | | 10/1988 | Leibinger et al. | |
| 7,080,585 B2 | * | 7/2006 | Prudhomme | B26D 7/025 83/143 |
| 8,915,527 B2 | * | 12/2014 | Watanabe | B65G 49/00 294/119.1 |
| 2015/0158150 A1 | * | 6/2015 | Taylor | B25B 1/2405 409/225 |

FOREIGN PATENT DOCUMENTS

JP    WO 2013157347 A1 * 10/2013 ............. B21D 43/24

* cited by examiner

*Primary Examiner* — Charles A Fox
*Assistant Examiner* — James Buckle, Jr.
(74) *Attorney, Agent, or Firm* — Hall Estill Attorneys at Law

(57) ABSTRACT

An apparatus and associated method contemplating handling a workpiece on a surface. A mounting block is selectively movable in a first direction toward the surface. A finger is coupled to the mounting block so that the finger is retractable in a second nonparallel direction opposed to the first direction. The finger supports an engagement member operably contacting the workpiece and subject to a reaction force from the workpiece that retracts the finger during movement of the mounting block in the first direction. The engagement member traverses the surface as a result of simultaneous movement of the mounting block in the first direction and retraction of the finger in the second direction.

17 Claims, 7 Drawing Sheets

WORKPIECE HANDLING

SUMMARY

Some embodiments of the present technology are generally directed to an apparatus for handling a workpiece on a surface. The apparatus has a mounting block that is selectively movable in a first direction toward the surface. A finger is coupled to the mounting block so that the finger is retractable in a second nonparallel direction opposed to the first direction. The finger supports an engagement member operably contacting the workpiece and subject to a reaction force from the workpiece that retracts the finger during movement of the mounting block in the first direction. The engagement member traverses the surface as a result of simultaneous movement of the mounting block in the first direction and retraction of the finger in the second direction.

Some embodiments of the present technology are generally directed to an apparatus for moving a workpiece across a surface. The apparatus has a frame that is selectively movable along a first axis and supports a mounting block. A finger supported by the mounting block is movable relative to the mounting block along a second axis between an extended position and a plurality of retracted positions. A resilient finger biasing member urges the finger to the extended position. An engagement member is supported by the finger and is configured to contact the workpiece for moving the workpiece by simultaneous movement of the frame toward the surface and retraction of the finger.

Some embodiments of the present technology are generally directed to a method for handling a workpiece on a surface. The method includes: obtaining an apparatus having a frame that is selectively movable along a first axis, a mounting block supported by the frame, a finger supported by the mounting block to be movable along a second axis, a resilient finger biasing member urging the finger to an extended position, and an engagement member supported by the finger and configured to contact the workpiece; advancing the frame toward the surface to contact the engagement member against the workpiece; and further advancing the frame toward the surface during the contact of the engagement member against the workpiece to retract the finger along the second axis and thereby move the workpiece across the surface.

DETAILED DESCRIPTION

Initially, it is to be appreciated that this disclosure is by way of example only, not by limitation. The workpiece handling concepts herein are not limited to use or application with any specific workpiece or in any specific method. Thus, although the instrumentalities described herein are for the convenience of explanation, shown and described with respect to exemplary embodiments, it will be appreciated that the principles herein may be applied equally in other types of systems and methods involving workpiece handling.

The present disclosure generally relates to workpiece handling equipment for moving a workpiece on a surface to a desired position, perhaps even clamping the workpiece to the surface at the desired position. The positioned and clamped workpiece can thus be made ready for a production process, for example. A "workpiece" for purposes of this description and meaning of the appended claims is a component part or assembly that is worked on. A production process for the positioned and clamped workpiece can vary widely such as machining processes, applying labels to or painting the workpiece, and the like.

Two different devices are conventionally necessary, one to move the workpiece on the surface and then another to clamp the workpiece on the surface. Two devices occupy more space than just one, which is problematic where compact manufacturing is important. An opportunity for improvement exists in combining the moving and the clamping functions into a single device. It is to that need that the embodiments of this technology are directed.

Figure 1:
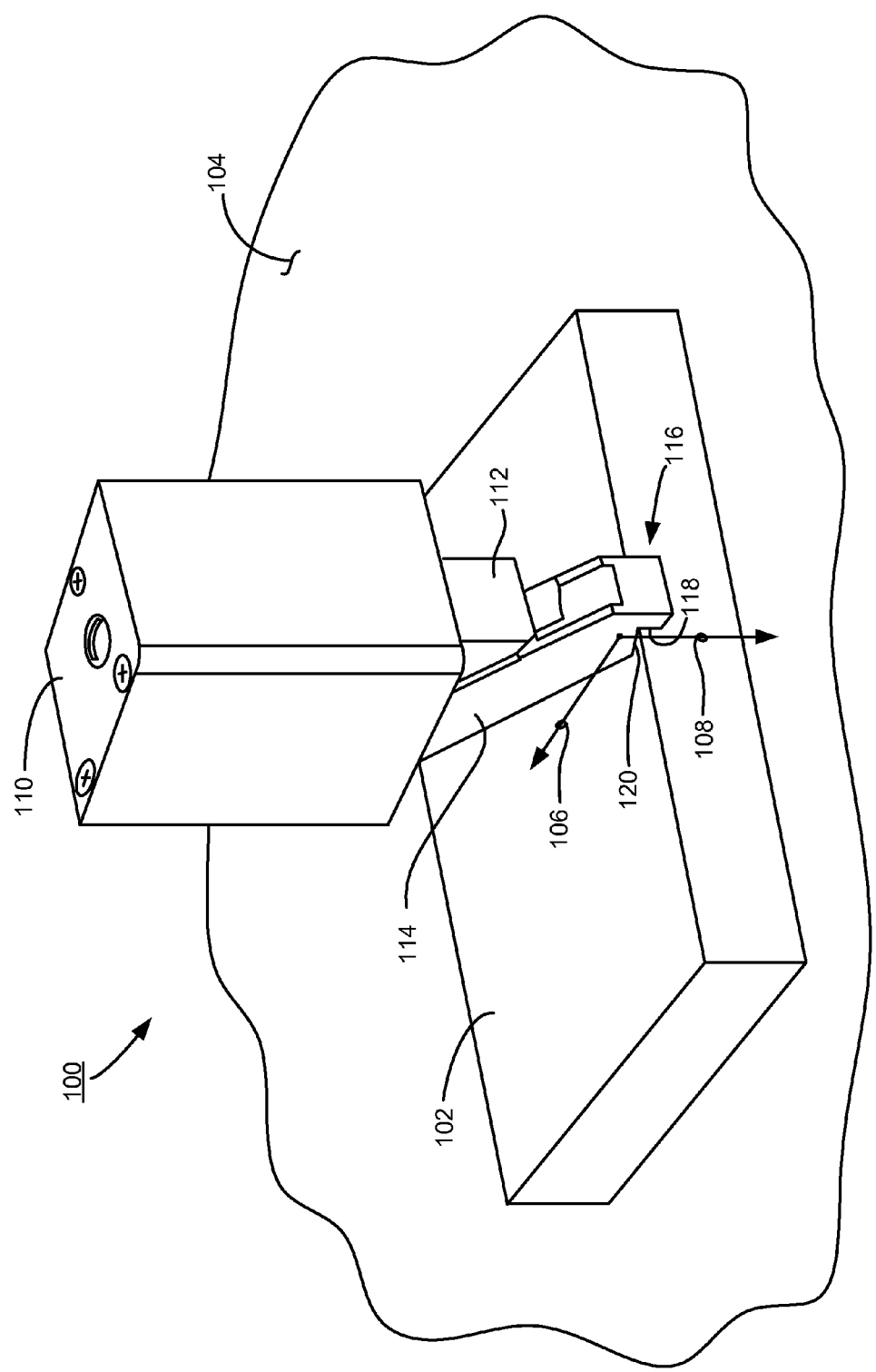
FIG. 1 is an isometric depiction of a workpiece handling device that is constructed in accordance with embodiments of this technology.

FIG. 1 is an isometric depiction of a handling apparatus 100 constructed in accordance with illustrative embodiments of this technology. The handling apparatus 100 operates on a workpiece 102 to first move the workpiece 102 on a supporting surface 104 by exerting a force in direction 106, and then to clamp the workpiece 102 against the supporting surface 104 by exerting a force in direction 108. The handling apparatus 100 has a frame 110 that is attached to manufacturing equipment capable of selectively reciprocating the frame 110 toward and away from the surface 104, such as a hydraulic or mechanical press and the like. The frame 110 supports a mounting block 112 that, in turn, supports a finger 114 that in these illustrative embodiments defines an engagement member 116 at a distal end thereof. Although in these illustrative embodiments the engagement member 116 is a unitarily formed portion of the finger 114, the contemplated embodiments are not so limited. In alternative embodiments an engagement member can be attached to a finger or activated by a finger, and the like. In these depicted embodiments the engagement member 116 has a substantially vertical surface 118 transferring the moving force 106 to the workpiece 102, and a substantially horizontal surface 120 transferring the clamping force 108 to the workpiece 102.

Figure 2:
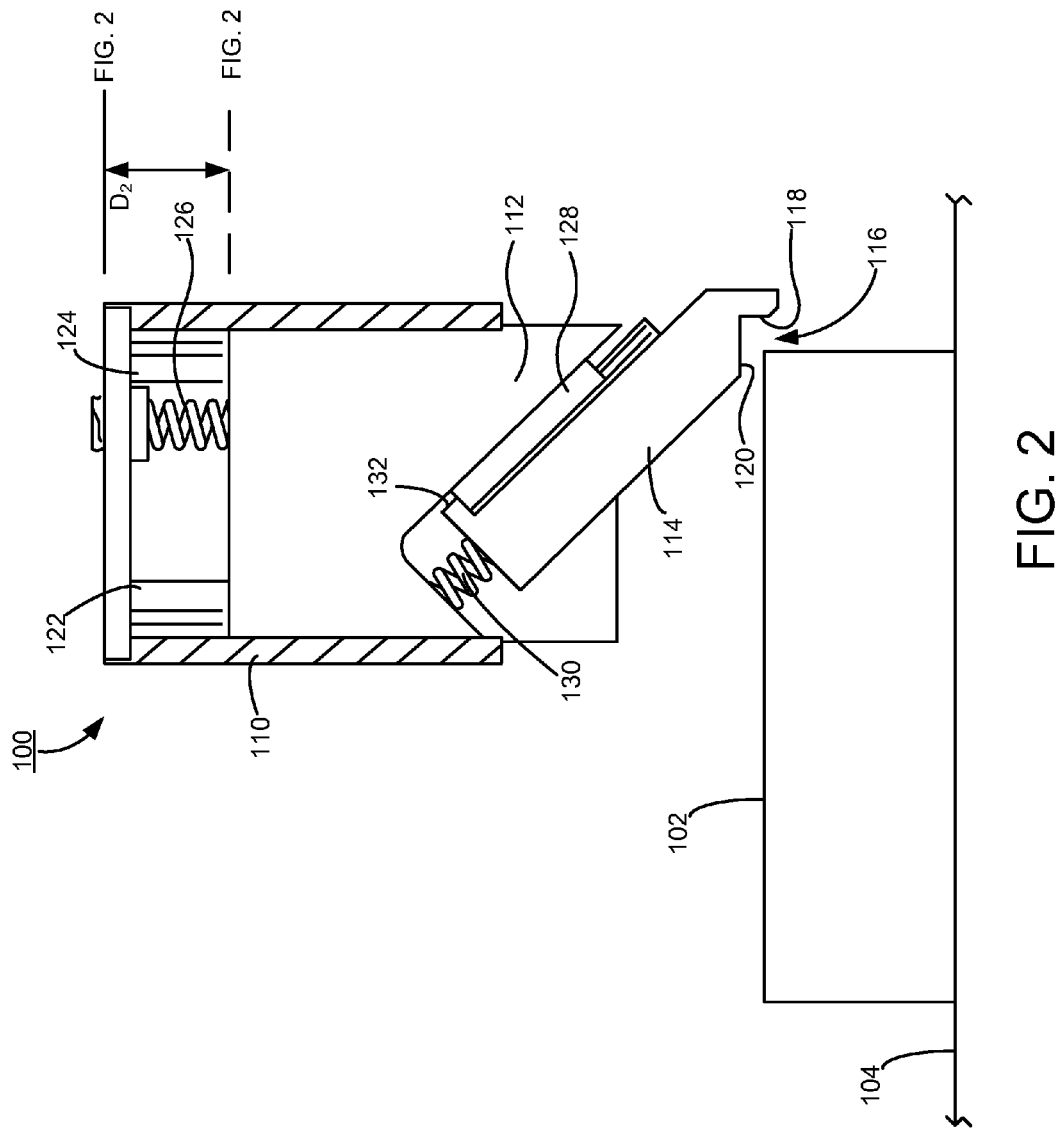
FIG. 2 is a partial cross sectional depiction of the workpiece handling device of FIG. 1 at a time when the frame supports the finger above the workpiece without contact.

FIG. 2 is a partial cutaway depiction of the handling apparatus 100 at time when the frame 110 supports the finger 114 so it does not contact the workpiece 102. A solid reference line labeled "FIG. 2" indicates the top edge of the frame 110 and a broken reference line labeled "FIG. 2" indicates the top edge of the mounting block 112 at this time. With no reaction force acting on the engagement member 116, a spring 126 urges the mounting block 112 to its lowermost, or extended position. The distance "$D_2$" between the reference lines corresponds to the spacing between the mounting block 112 and the top of the frame 110 when the mounting block 112 is at its extended position. Those reference lines appear in other FIGS. to depict how the spacing indicates when the mounting block 112 is in its extended position, as opposed to a retracted position.

Movement of the frame 110 as depicted along a vertical axis, and orthogonal to the workpiece 102, is not necessary for practicing this technology. From reading this description the skilled artisan understands that in alternative embodiments a frame can move in other advantageous directions, and at other angles with respect to the workpiece. For example, without limitation, in alternative embodiments a frame can be selectively moved horizontally to handle a workpiece supported at some angle to a frame axis of travel.

The mounting block 112 is supported so that it is slidable relative to the frame 110. In these illustrative embodiments the mounting block 112 is supported by a linear slide mechanism having slide rails 122, 124. The compressed spring 126 between the frame 110 and the mounting block 112 urges the mounting block 112 to its extended position. A mechanical stop (not depicted) such as in the linear slide limits the mounting block 112 from moving beyond the extended position, as depicted in FIG. 2.

Generally, this technology contemplates a resilient biasing member (such as the compression spring 126 depicted) that urges the mounting block 112 to its extended position. Alternatively, other types of resilient biasing members can be used such as an elastomeric pad and the like. Further, the technology is not limited to the mounting block biasing member being a compression member as depicted. Alternatively, the mounting block biasing member can be a resilient tensile member, a weight member, and the like. In any event, an upward force that is greater than the downward force of the biasing member retracts the mounting block 112 from the extended position to one of a plurality of retracted positions.

Although not depicted, the skilled artisan understands that in other embodiments the biasing member is optional. In that case the mounting block 112 could be rigidly affixed to the frame 110, such as by fasteners or welding, or a mounting block could be used alone without a frame. There would be no retraction of the mounting member relative to the frame. However, the depicted embodiments are advantageously less complex because the mounting block 112 retraction makes positioning the frame 110 to clamp the workpiece 102 significantly less complex. The final clamping position of the frame 110 need only be precise enough to retract the mounting block 112, so that the spring 126 becomes the controlling factor for the clamping force instead of the position of the frame 110.

The finger 114 is coupled to the mounting block 112 to be retractable in an opposed direction to the downward vertical movement of the mounting block 112. As described below, the term "opposed" for this description and meaning of the claims means that the retraction of the finger 114 is caused by a reaction force from engaging the workpiece 102 that has a component in direct opposition (upward) to the downward force of the mounting block 112.

In these depicted embodiments the finger 114 is slidably supported by a linear slide mechanism 128. A resilient biasing member (spring 130) between the mounting block 112 and the finger 114 urges the finger 114 to an extended position. A positive stop 132 limits the movement of the finger 114 to no further than its extended position. As described below, the finger 114 is also retractable to a plurality of retracted positions. Although the spring 130 is depicted as the resilient biasing member in these illustrative embodiments, the contemplated embodiments are not so limited. In alternative embodiments the resilient biasing member can be an elastomeric member, a deflectable protuberance, and the like.

Figure 3:
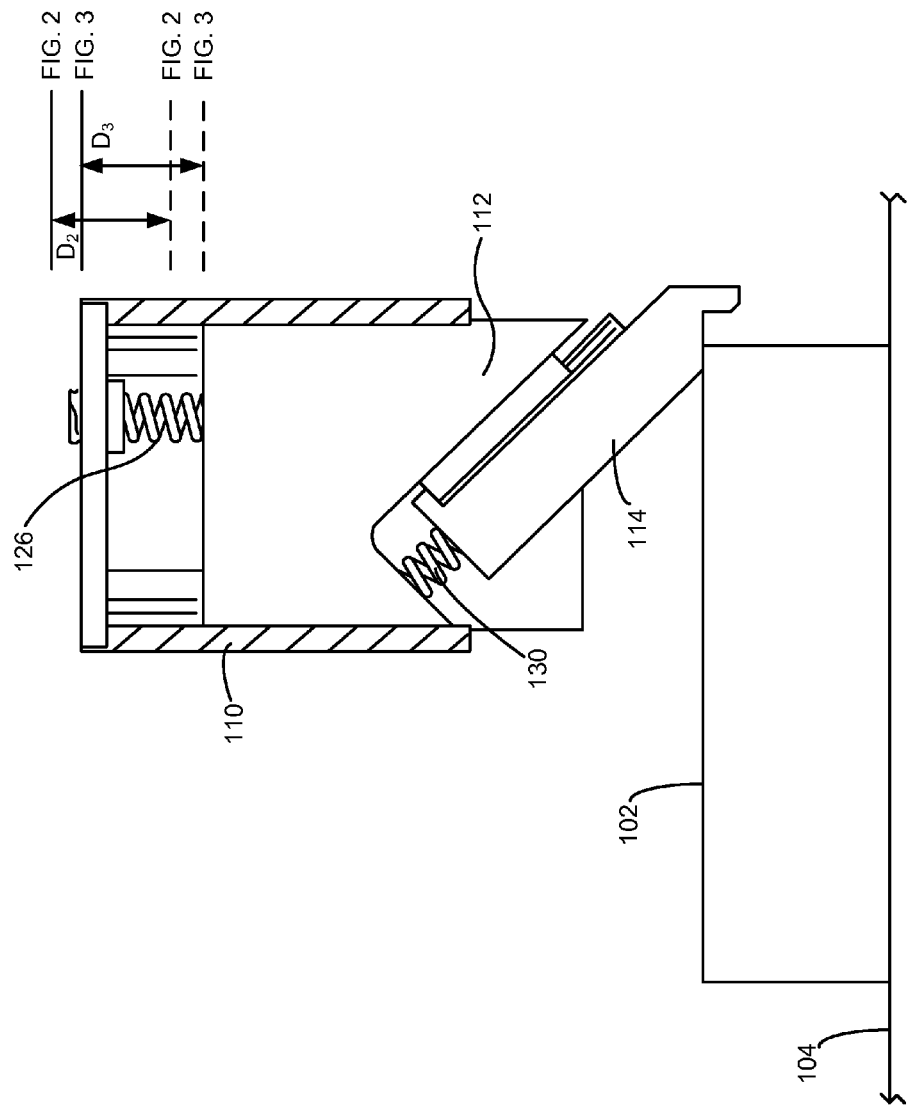
FIG. 3 is similar to FIG. 2 but depicting a time when the frame has lowered the finger into contact with the workpiece.

FIG. 3 is similar to FIG. 2 but depicting a time when the frame 110 has moved downward enough so that the finger 114 first makes contact with the workpiece 102. The solid and broken reference lines indicate that spacing between the frame 110 and the mounting block 112 has not changed. That is, $D_2$ and $D_3$ are equivalent at this time. Thus, the mounting block 112 is still at its extended position by the force of spring 126. The finger 114 is also still at its extended position because at first contact no reaction force acts in opposition to the spring 130.

Figure 4:
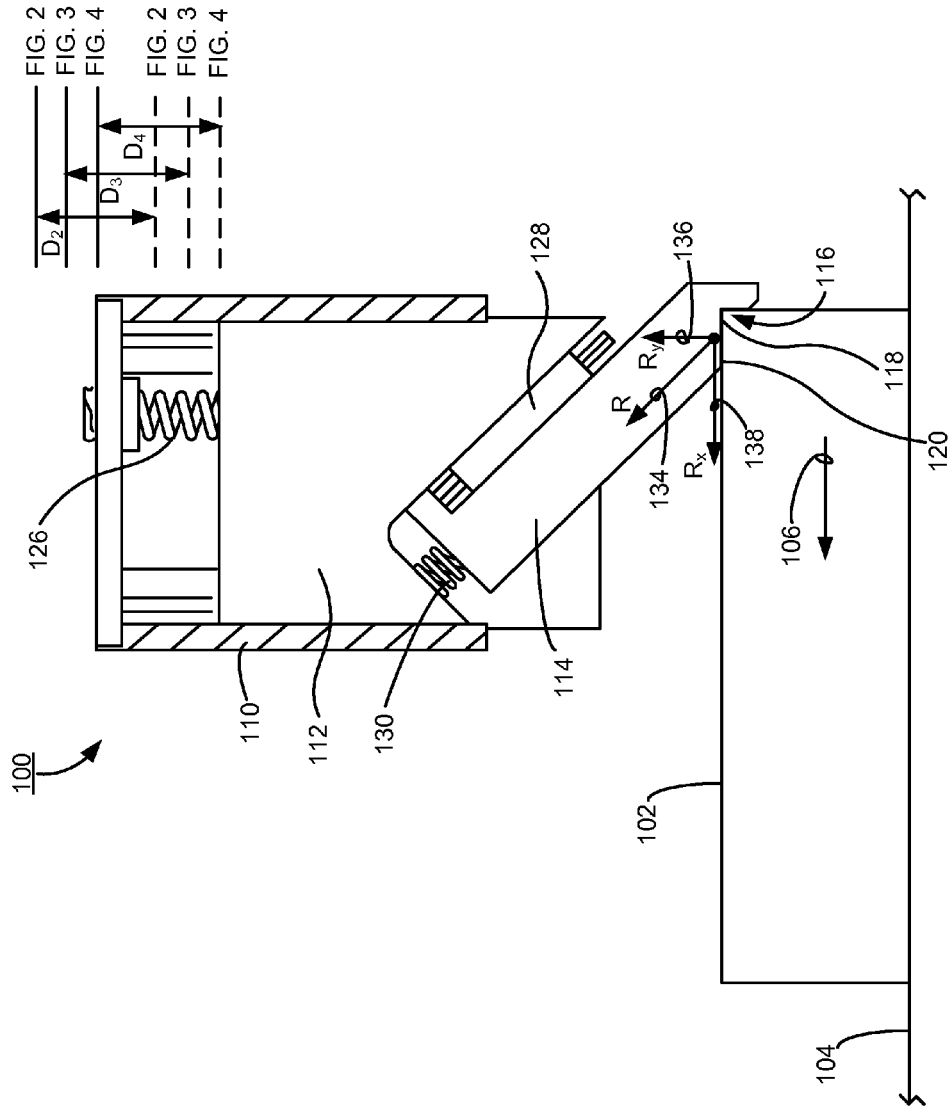
FIG. 4 is similar to FIG. 3 but depicting a time when the frame has lowered the finger so that the finger retracts into the mounting block.

FIG. 4 is similar to FIG. 3 but depicting a time when the frame 110 has moved further downward after the initial contact of the finger 114 against the workpiece 102. The solid and broken reference lines indicate that the mounting block 112 is still at its extended position, because $D_2$, $D_3$, and $D_4$ are equivalent. The downward movement of the frame 110 subjects the finger 114 to a reaction force "R" 134 from the workpiece 102 that retracts the finger 114 against the biasing force of the spring 130. As the finger 114 retracts, the spring 130 compresses, as depicted in FIG. 4. The spring 130 has a lighter stiffness than the spring 126 so that at this time the spring 130 has compressed but the mounting block 112 is still at its extended position.

As discussed above, the finger 114 retracts in a direction that is opposed to the downward movement of the mounting block 112. That is, the reaction force 134 has an upward component of force 136, but there is no downward component of reaction force. The engagement member 116 traverses the surface 102 subjecting force 106 to the workpiece 102, the result of simultaneous downward movement of the mounting block 112 and retraction of the finger 114. In these illustrative embodiments the vertical surface 118 of the engagement member 116 pressingly engages against the workpiece 102 to move it across the surface 102.

Figure 5:
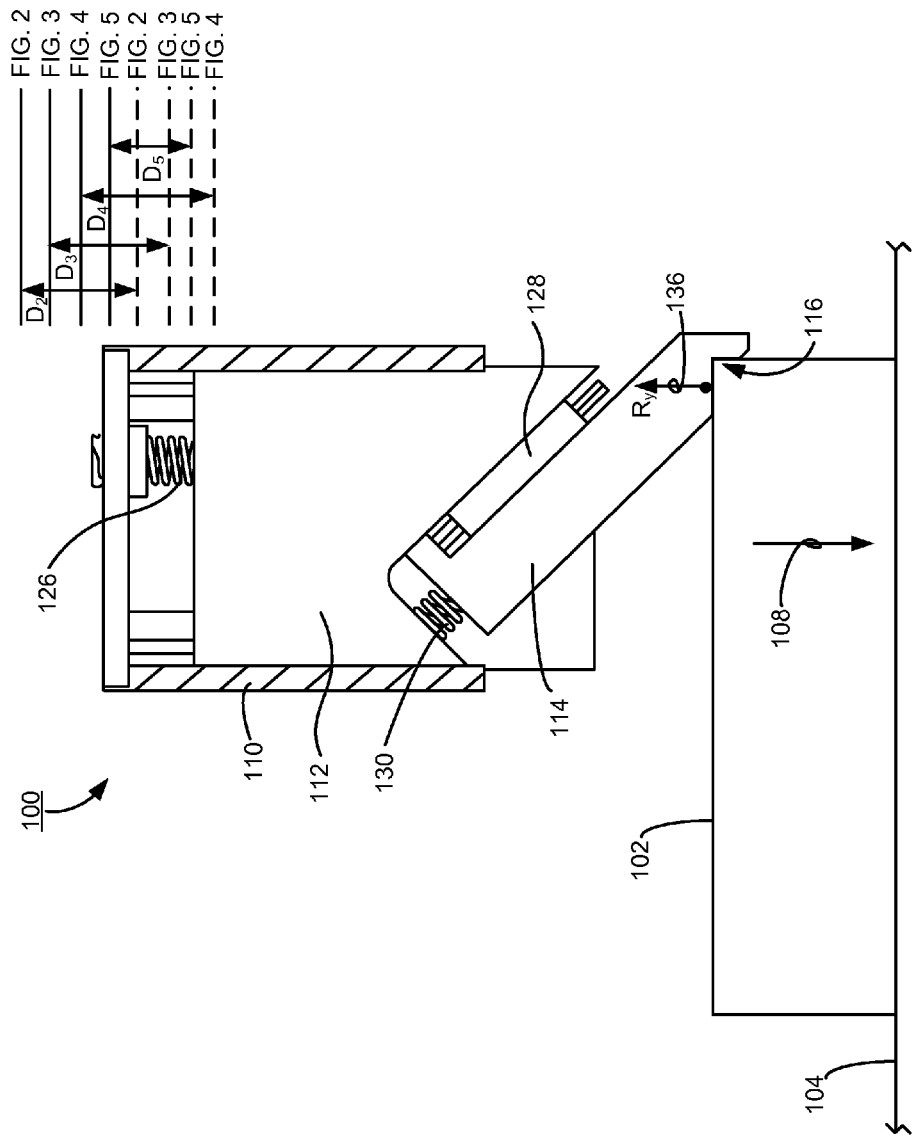
FIG. 5 is similar to FIG. 4 but depicting a time when the force of the finger biasing member overcomes the force of the mounting block biasing member.

FIG. 5 depicts even further downward movement of the frame 110 eventually causes the finger 114 to reach its limit of retraction. In these depicted embodiments the respective stiffness of the springs 126, 130 are selected so that a predetermined compression of spring 130 occurs when a vertical reaction component $R_y$ force is greater than the force of spring 126. At that predetermined compression of spring 130, the mounting block 112 retracts upward and compresses the spring 126 until the $R_y$ force and the force of spring 126 are equivalent. The spacing between the mounting block 112 and the frame 110 decreases as the mounting block 112 retracts. That is, D5 is less than $D_2$, $D_3$, and $D_4$. Movement of the workpiece 102 ends when retraction of the finger 114 ends. With no movement of the workpiece 102, the downward force then serves to clamp the workpiece 102 against the surface 104. Particularly, the compressed spring 126 imparts the clamping force 108 on the workpiece 102 against the surface 104.

Figure 6:
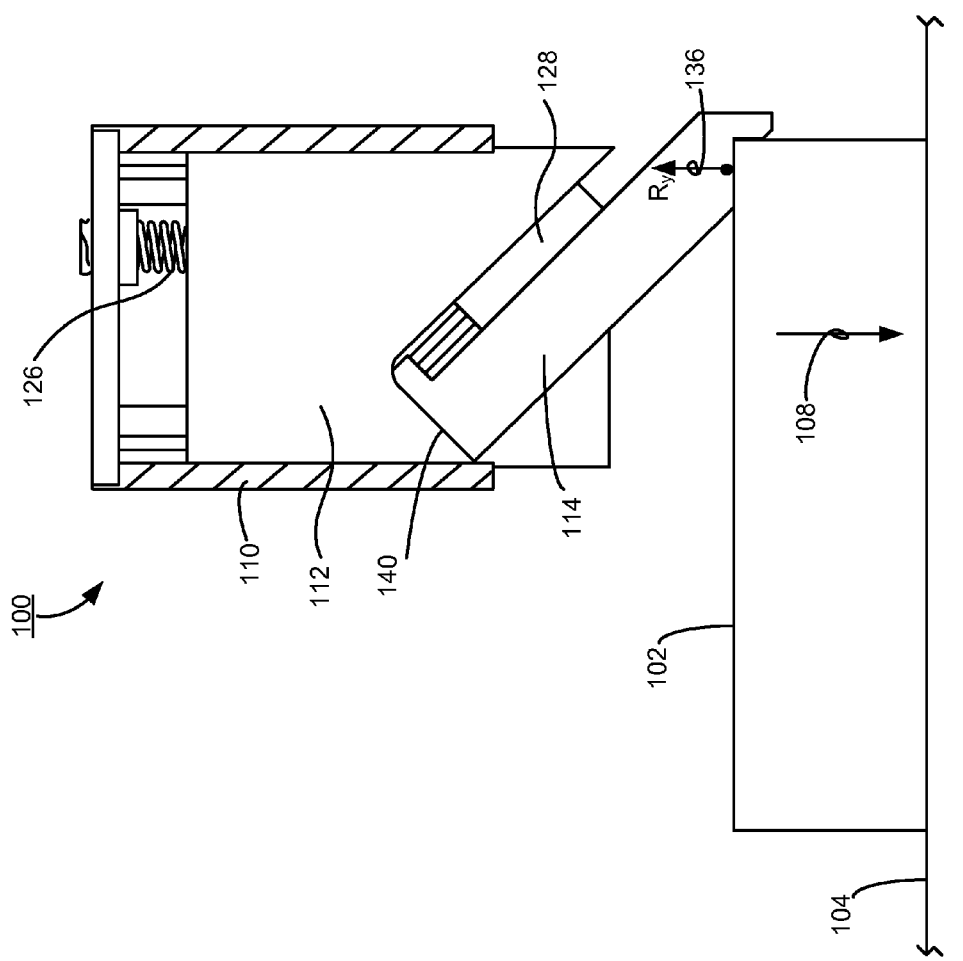
FIG. 6 is similar to FIG. 4 but depicting the finger retraction ended by the finger contacting a positive stop defined by the mounting block.

FIG. 6 depicts other embodiments in which the finger 114 reaches its limit of retraction by abutting against a positive stop 140 in the mounting block 112. The spring 130 in these illustrative embodiments is not depicted because it has compressed into a bore formed in the end of the finger 114. As in FIG. 5, the vertical reaction component $R_y$ directly opposes the force of spring 126. Retraction of the mounting block 112 to further compress the spring 126 imparts the force 108 for clamping the workpiece 102 against the surface 104.

Figure 7:
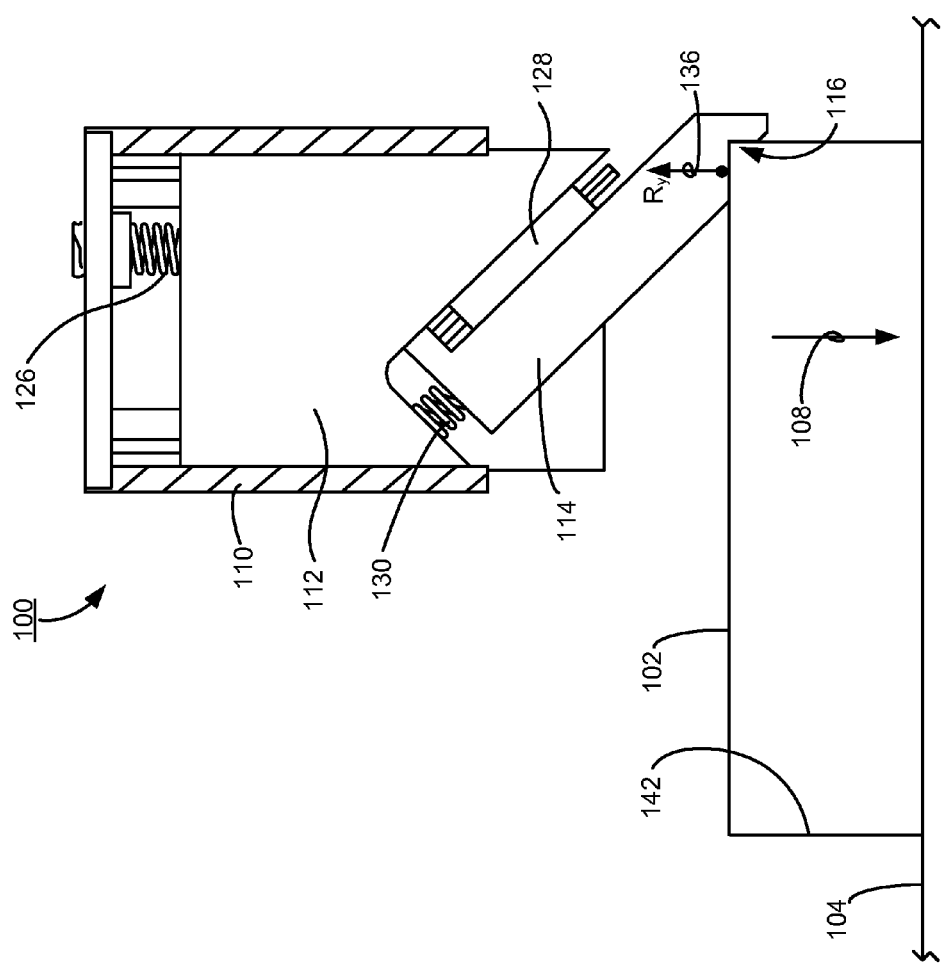
FIG. 7 is similar to FIG. 4 but depicting the finger retraction ended by the workpiece contacting a datum surface.

FIG. 7 depicts yet other embodiments in which the finger 114 reaches its limit of retraction when the workpiece 102, as it moves across the surface 104 as described above, abuts against a datum surface 142. Importantly, in these illustrative embodiments the springs 126, 130 are sized (with respect to stiffness) so that just before the workpiece 102 contacts the datum surface 142 the vertical reaction component $R_y$ is less than the force of the spring 126. That permits the finger 114 to continue moving the workpiece 102 across the surface 104 until only contacting the datum surface 142 stops the workpiece 102 movement. As in FIGS. 5 and 6, when the retraction of the finger 114 stops because the workpiece 102 contacts the datum surface 142, the vertical reaction component $R_y$ increases against the force of spring 126. Retraction of the mounting block 112 to further compress the spring 126 imparts the force 108 for clamping the workpiece 102 against the surface 104. In these embodiments the datum surface 142 advantageously locates the workpiece 102 precisely, permitting precision operations on the workpiece 102 after it has been moved across and clamped to the surface 104 in accordance with this technology.

All of the illustrated embodiments have in common the advantage that one device both moves the workpiece on the support surface and then clamps the workpiece to the support surface. The novel arrangement and associated methods replace previously attempted solutions that required one device to move the workpiece and another device to clamp the workpiece. The coordinated unitary design of this technology permits full control of moving the workpiece until a predetermined event ends the retraction of the finger; be it the finger biasing member size, a positive stop in the mounting block, or a datum surface in the path of the workpiece movement. The latter in particular provides highly precise positioning of the workpiece before clamping it.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular processing environment without departing from the spirit and scope of the present invention. In addition, although the embodiments described herein are directed to horizontal positioning and vertical clamping, it will be appreciated by those skilled in the art that the claimed subject matter is not so limited and various other directional positioning and clamping can be achieved without departing from the spirit and scope of the claimed technology.

What is claimed is:

1. An apparatus for handling a workpiece on a surface, the apparatus comprising:
   a frame:
   a mounting block supported by the frame to be movable relative to the frame in a first direction toward the surface;
   a resilient mounting block biasing member operably urging the mounting block toward an extended position;
   a finger coupled to the mounting block so that the finger is retractable in a second nonparallel direction opposed to the first direction, the finger supporting an engagement member operably contacting the workpiece and subject to a reaction force from the workpiece that retracts the finger during movement of the mounting block in the first direction, the engagement member traversing the surface as a result of simultaneous movement of the mounting block in the first direction and retraction of the finger in the second direction; and
   a resilient finger biasing member operably urging the finger toward an extended position.

2. The apparatus of claim 1 comprising a linear slide supporting the finger in movement relative to the mounting block.

3. The apparatus of claim 1 wherein the engagement member supports a first surface configured to engage the workpiece to move the workpiece across the surface, and the engagement member supports a second surface configured to engage the workpiece to clamp the workpiece against the surface.

4. The apparatus of claim 1 wherein the finger biasing member has a lower stiffness than the mounting block biasing member.

5. The apparatus of claim 1 wherein the biasing members are sized so that the finger is subject to a reaction force acting opposite the first direction and greater than a force of the mounting block biasing member acting in the first direction.

6. The apparatus of claim 1 wherein the mounting block defines a positive stop that limits the finger retraction and subjects the finger to a reaction force acting opposite the first direction and greater than a force of the mounting block biasing member acting in the first direction.

7. The apparatus of claim 1 wherein the biasing members are springs.

8. The apparatus of claim 1 wherein the biasing members are compression members.

9. The apparatus of claim 1 comprising a linear slide supporting the mounting block in movement relative to the frame.

10. The apparatus of claim 1 wherein a datum surface limits the workpiece movement across the surface, and wherein the biasing members are sized so that before the workpiece contacts the datum surface the finger is subject to a reaction force acting opposite the first direction and less than a force of the mounting block biasing member acting in the first direction.

11. The apparatus of claim 10 wherein contact of the workpiece against the datum surface limits retraction of the finger and subjects the finger to a reaction force acting opposite the first direction and greater than the force of the mounting block biasing member acting in the first direction.

12. The apparatus of claim 10 where further movement of the frame in the first direction after the workpiece contacts the datum surface retracts the mounting block.

13. An apparatus for moving a workpiece across a surface, comprising:
   a frame that is selectively movable along a first axis;
   a mounting block supported by the frame to be operably moveable relative to the frame along the first axis between an extended position and a plurality of retracted positions;
   a resilient mounting block biasing member operably urging the mounting block to the extended position;
   a finger supported by the mounting block so that the finger is movable relative to the mounting block along a second axis between an extended position and a plurality of retracted positions;

a resilient finger biasing member urging the finger to the extended position; and an engagement member supported by the finger and configured to operably contact the workpiece for moving the workpiece by simultaneous movement of the frame toward the surface and retraction of the finger.

14. A method for handling a workpiece on a surface, comprising:

obtaining an apparatus having a frame that is selectively movable along a first axis, a mounting block supported by the frame to be moveable relative to the frame, a resilient mounting block biasing member operably urging the mounting block toward an extended position, a finger supported by the mounting block to be movable along a second axis, a resilient finger biasing member urging the finger to an extended position, and an engagement member supported by the finger and configured to contact the workpiece;

advancing the frame toward the surface to contact the engagement member against the workpiece; and further advancing the frame toward the surface during the contact of the engagement member against the workpiece to retract the finger along the second axis and thereby move the workpiece across the surface.

15. The method of claim 14 comprising limiting the movement of the workpiece.

16. The method of claim 15 comprising further advancing the frame toward the surface during the contact of the engagement member against the workpiece and after limiting movement of the workpiece to clamp the workpiece against the surface.

17. An apparatus for handling a workpiece, the apparatus comprising:

a mounting block movable in a first direction;

a finger coupled to the mounting block and retractable in a second direction and supporting an engagement member;

a resilient finger biasing member urging the finger;

a frame supporting the mounting block; and a resilient mounting block biasing member urging the mounting block.

* * * * *